US011658397B2

United States Patent
Ramsey et al.

(10) Patent No.: US 11,658,397 B2
(45) Date of Patent: May 23, 2023

(54) WIRELESS COMMUNICATION SYSTEM WITHIN AN EXTERNAL ENCLOSURE FOR ATTACHMENT TO A VEHICLE

(71) Applicant: uAvionix Corporation, Bigfork, MT (US)

(72) Inventors: Christian Ramsey, Purcellville, VA (US); Paul Beard, Bigfork, MT (US); Jeff Walker, Republic, MO (US); Ryan Braun, Chicago, IL (US)

(73) Assignee: uAvionix Corporation, Bigfork, MT (US)

( * ) Notice: Subject to any disclaimer, the term of this patent is extended or adjusted under 35 U.S.C. 154(b) by 0 days.

(21) Appl. No.: 17/236,134

(22) Filed: Apr. 21, 2021

(65) Prior Publication Data

US 2021/0242575 A1    Aug. 5, 2021

Related U.S. Application Data

(63) Continuation of application No. 16/910,889, filed on Jun. 24, 2020, now Pat. No. 11,011,830.

(60) Provisional application No. 62/873,548, filed on Jul. 12, 2019.

(51) Int. Cl.
*H01Q 1/24* (2006.01)
*H01Q 1/28* (2006.01)
*G01S 19/33* (2010.01)

(52) U.S. Cl.
CPC ............ *H01Q 1/283* (2013.01); *G01S 19/33* (2013.01); *H01Q 1/241* (2013.01)

(58) Field of Classification Search
CPC ........... H01Q 1/283; H01Q 1/241; H01Q 1/28
See application file for complete search history.

(56) References Cited

U.S. PATENT DOCUMENTS

| 5,334,982 A | 8/1994 | Owen |
| 2012/0098714 A1 | 4/2012 | Lin et al. |
| 2016/0050013 A1* | 2/2016 | Brownjohn ........... H04W 4/021 370/316 |
| 2016/0170025 A1 | 6/2016 | Johnson et al. |
| 2018/0100914 A1 | 4/2018 | Beard |

OTHER PUBLICATIONS

Written Opinion and International Search Report in PCT Application No. PCT/US2020/040854, dated Sep. 28, 2020 (12 pages).
Examination Report in counterpart Canadian Application No. 3,086,686 dated Jun. 7, 2021 (4 pages).

\* cited by examiner

*Primary Examiner* — Graham P Smith
(74) *Attorney, Agent, or Firm* — Finnegan, Henderson, Farabow, Garrett & Dunner LLP

(57) ABSTRACT

Disclosed herein are systems for routing wireless communications. Some systems may include an apparatus comprising an enclosure configured to attach to an external portion of an aircraft and which may contain: a wireless communications device, and an antenna in communication with the wireless communications device and configured to send or receive signals to and/or from aircraft.

24 Claims, 10 Drawing Sheets

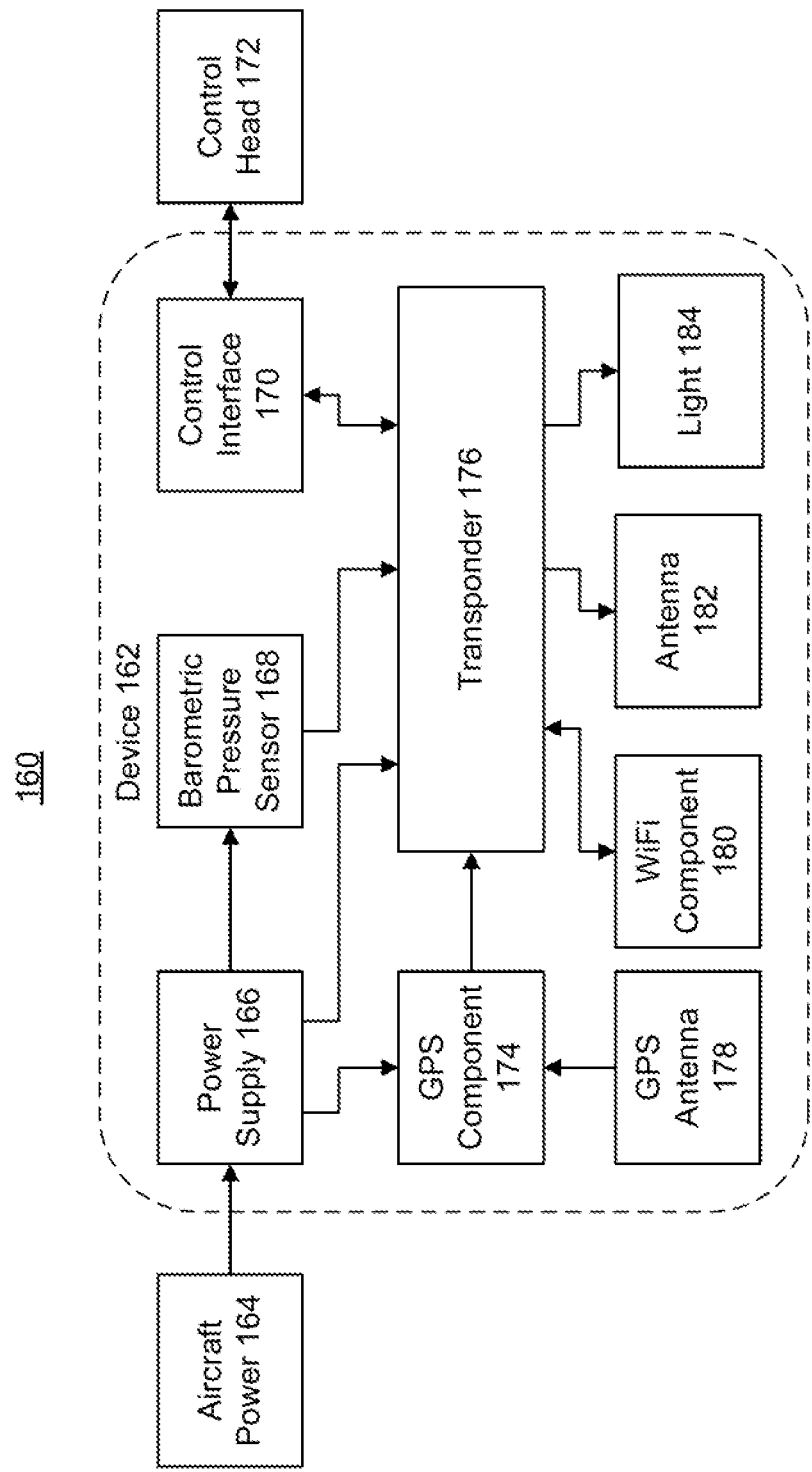

WIRELESS COMMUNICATION SYSTEM WITHIN AN EXTERNAL ENCLOSURE FOR ATTACHMENT TO A VEHICLE

CROSS-REFERENCE TO RELATED APPLICATIONS

This application is a continuation of, and claims priority to, U.S. patent application Ser. No. 16/910,889, filed on Jun. 24, 2020, currently pending, which claims priority to U.S. Provisional Patent App. No. 62/873,548, filed on Jul. 12, 2019. The disclosures of the above-referenced applications are expressly incorporated herein by reference in their entireties.

TECHNICAL FIELD

The subject matter described herein generally relates to improving communications between aircraft and other ground, air, or space-based entities. For example, certain disclosed embodiments are directed to an apparatus for routing wireless communications to and/or from an aircraft. Embodiments also include routing wireless communications from the aircraft above and below an aircraft. This apparatus may have a particular shape, angling, installation location, and/or combination of parts allowing for effective communication to and from an aircraft. The apparatus may also be configured to attach to an aircraft. In some cases, such an apparatus may transmit and receive communications to a transmitter and/or receiver using existing electric power wiring.

BACKGROUND

Modern aircraft have important needs for communication with other entities, especially ground-based flight coordinators and other aircraft. Flying has many associated threats, including part malfunctions, dangerous weather, and even mid-air collision. Effective communication to and from aircraft navigating the skies is crucial to mitigating these threats and thereby improving safety of aircraft passengers, pilots, and entities on the ground.

Conventional systems typically rely on one or more antennas and a transponder inside the aircraft to receive, transmit, and process various data communications. Some of these data communications may include those sent according to the ADS-B (Automatic Dependent Surveillance-Broadcast) standard. However, as communication demands on aircraft have increased, existing systems have not always kept pace to meet these needs in an efficient, reliable, and cost-effective manner.

Moreover, conventional aircraft are increasingly expected to communicate not only with ground-based communications entities and other aircraft, but also with satellites. Existing systems on aircraft may be challenged by effectively communicating, simultaneously in some cases, with satellites, other aircraft, and ground-based systems due to the antennas available on the aircraft, the antenna locations, or the available surface area to install antennas not balancing desirable positioning for line-of-sight communications while simultaneously reducing interference to or from other antennas for other systems on the aircraft. For example, some aircraft may only have an antenna that is best suited to only communicate with a subset of these entities, while sacrificing communications to others. Retrofitting an aircraft with data communications wiring, new exterior access points, and new antennae may be enormously complex and cost-prohibitive for many aircraft and therefore does not present a viable solution. Moreover, such retrofitting may be complicated to implement and may involve significant changes depending on the aircraft being modified.

In view of the technical deficiencies of current systems, there is a need for an apparatus that can be easily and cost-effectively installed to an aircraft without causing significant modifications to the aircraft as it currently exists, while optimizing communication line-of-sight paths to ground, air, and space-based entities. The apparatus discussed below offers many technological improvements in efficiency, usability, and cost savings. For example, according to one embodiment, a single apparatus may be configured for installation on a wing or tail of an aircraft, which may allow for communication with both surveillance satellites as well as ground-based systems without requiring two separate antennae. Moreover, this apparatus may be integrated with aircraft-position and anti-collision lighting, which may leverage existing aircraft wiring and mounting locations.

Related advantages may result from disclosed embodiments that integrate a communications device (e.g., a transponder) and an antenna into a single apparatus. Such embodiments may allow for installation of multiple components simultaneously, reducing the complexity and cost of installation.

Further, some disclosed embodiments allow for an apparatus that may have unique antenna placement and angling, which may allow for more reliable communications with ground, air, and space objects. And, in some disclosed embodiments, the apparatus may communicate to components inside an aircraft by using direct wiring (e.g., serial, coaxial, CAT-5, optical, etc.) and/or wireless signaling. In some cases, the apparatus may use existing electrical wiring to improve ease of integration into the aircraft.

SUMMARY

Some disclosed embodiments describe an apparatus for routing wireless communications. For example, the apparatus may include an enclosure configured to attach to an external portion of an aircraft and containing: a wireless communications device, and an antenna in communication with the wireless communications device and configured to send or receive signals to or from the aircraft.

In accordance with further embodiments, the enclosure is configured to attach to an external lighting interface of the aircraft.

In accordance with further embodiments, the apparatus may further comprise further comprising a light, wherein: the light is one of a navigation light, anti-collision light, rear-position light, rotating beacon light, or landing light.

In accordance with further embodiments, the enclosure is configured to attach to one of a wing or tail of the aircraft.

In accordance with further embodiments, the enclosure is configured to allow a light to attach to the enclosure.

In accordance with further embodiments, the wireless communications device comprises a transponder.

In accordance with further embodiments, the enclosure is configured to attach to an external lighting interface of the aircraft.

In accordance with further embodiments, the apparatus is configured to send signals to, or receive signals from, above and below the aircraft.

In accordance with further embodiments, the antenna is a dipole antenna configured to send signals to, or receive signals from, above and below the aircraft.

In accordance with further embodiments, the apparatus further comprises a light, wherein: the light is one of a navigation light, anti-collision light, rear-position light, rotating beacon light, or landing light.

In accordance with further embodiments, the enclosure is configured to attach to one of a wing or tail of the aircraft.

In accordance with further embodiments, the enclosure is configured to allow a light to attach to the enclosure.

In accordance with further embodiments, the transponder is configured to send and/or receive an ADS-B signal.

In accordance with further embodiments, the enclosure contains a global navigation satellite system (GNSS) receiver.

In accordance with further embodiments, the enclosure contains a global navigation satellite system (GNSS) antenna.

In accordance with further embodiments, the enclosure contains a barometric altimeter.

In accordance with further embodiments, the enclosure contains a radio antenna.

In accordance with further embodiments, the transponder operates according to one of Modes 1, 2, 3, A, C, S, ES, 4, or 5.

In accordance with further embodiments, the apparatus is configured to send signals to, or receive signals from, above and below the aircraft.

In accordance with further embodiments, the antenna is a dipole antenna configured to send signals to, or receive signals from, above and below the aircraft.

In accordance with further embodiments, the antenna is a monopole antenna.

Further disclosed embodiments include an apparatus for routing wireless communications. For example, the apparatus may comprise: a fin-shaped enclosure configured to attach to an external portion of an aircraft and containing: a wireless communications device, and an antenna in communication with the wireless communications device and configured to send or receive signals from above or below the aircraft.

In accordance with further embodiments; the wireless communications device comprises a transponder.

In accordance with further embodiments, the enclosure is configured to attach to a wing of the aircraft.

In accordance with further embodiments, the enclosure is configured to attach to a tail of the aircraft.

In accordance with further embodiments, the enclosure is configured to attach to a fuselage of the aircraft.

In accordance with further embodiments, the antenna is a dipole antenna.

In accordance with further embodiments, the enclosure comprises at least two protruding fins containing the dipole antenna.

In accordance with further embodiments, the enclosure includes at least one protruding fin that is canted toward a rear side of the aircraft while the enclosure is attached to the aircraft.

In accordance with further embodiments, the at least one protruding fin is canted toward the rear side of the aircraft at an angle of between 5 and 60 degrees relative to a vertical axis.

In accordance with further embodiments, the angle is based on at least one of: a model of the aircraft, a shape of a fuselage of the aircraft, a size of a fuselage of the aircraft, a shape of a wing of the aircraft, or a size of a wing of the aircraft.

In accordance with further embodiments, the enclosure includes at least one protruding fin that is canted away from a fuselage of the aircraft while the enclosure is attached to the aircraft.

In accordance with further embodiments, the at least one protruding fin is canted away from the fuselage of the aircraft at an angle of between 5 and 60 degrees relative to a vertical axis.

In accordance with further embodiments, the angle is based on at least one of: a model of the aircraft, a shape of a fuselage of the aircraft, a size of a fuselage of the aircraft, a shape of a wing of the aircraft, or a size of a wing of the aircraft.

In accordance with further embodiments, the enclosure is composed of a signal interference-reducing material.

In accordance with further embodiments, the enclosure is composed of a plastic.

In accordance with further embodiments, the enclosure is coated in a heat-resistant, low-friction coating.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 10 illustrates an exemplary schematic representation of a second wireless communications system.

DETAILED DESCRIPTION OF EXEMPLARY EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the components, materials, methods, and examples are illustrative only and are not intended to be necessarily limiting.

Figure 1A:
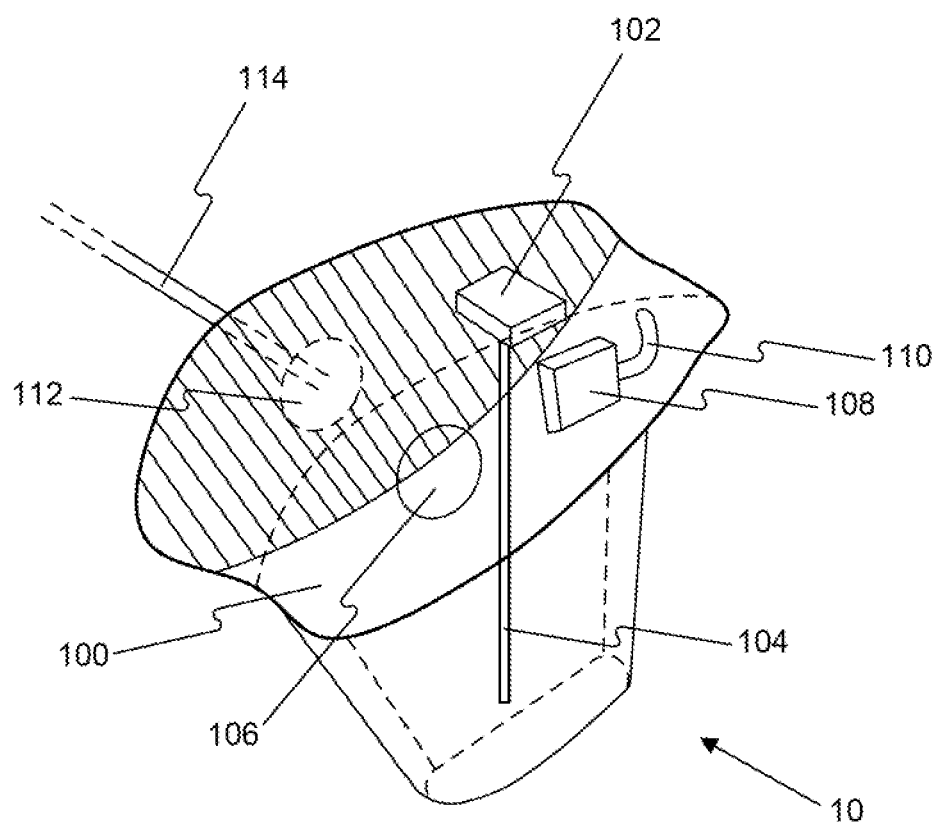
FIG. 1A illustrates an exemplary pictographic representation of a wireless communications apparatus.

FIG. 1A illustrates an exemplary pictographic representation of wireless communications apparatus 10 and other exemplary elements. While this figure may describe a context of affixing a wireless communications apparatus to a wing (e.g., at a light fixture) of an aircraft, one will appreciate that other configurations are possible, such as the wireless communications apparatus being suited to attach to a tail (e.g., at a light fixture) of an aircraft, a fuselage of an aircraft, or anywhere else on the aircraft with visibility to devices communicating with the wireless communications apparatus. In some embodiments, wireless communications apparatus 10 may be configured to be mounted using existing lighting locations and may use a downward pointing monopole antenna for optimization of ground and air-based communications. In some embodiments, a wireless communications apparatus 10 may be enclosed by an enclosure 100. In some embodiments, enclosure 100 may be configured to attach to an external portion of an aircraft, drone, boat, and/or other vehicle. In some embodiments, wireless communications apparatus 10 may be configured for attachment to a particular vehicle and/or particular part of a vehicle, such as to an external lighting interface of an aircraft (e.g., a connection point for a Grimes wingtip strobe light). In some embodiments, wireless communications apparatus 10 and/or enclosure 100 may have a shape, size angling, material composition, combination of parts, and/or other configuration that may be based on an aircraft, and/or a particular area of an aircraft, to which it will be attached. For example, enclosure 100 and/or any other part of wireless communications apparatus 10 may be configured to attach to a wing, tail, and/or fuselage of an aircraft. In some embodiments, wireless communications apparatus 10 may be configured to attach parallel to a vertical and/or horizontal centerline of an aircraft. To facilitate attachment, enclosure 100 may include a portion shaped for connection to a socket of an aircraft, groves, threads, fastener connection points (e.g., holes for rivets), a snap fastening mechanism, and/or any other portion with a shape, size, material, flexibility, etc. suitable for attaching to an aircraft. In some embodiments, enclosure 100 may be configured to attach to a mounting plate. In other embodiments, enclosure 100 may be configured to attach to another vehicle altogether (e.g., a drone, boat, etc.).

Enclosure 100 may completely or partially enclose components of wireless communications apparatus 10. For example, enclosure 100 may include an opening 112, which may allow for wiring 114 or other objects to pass through or otherwise access components internal to enclosure 100 (e.g., a circuit board, processor, memory, sensor, etc.), including human access for maintenance, part upgrades, and the like. Wiring 114 may comprise any combination of conductive and insulating materials configured to carry power and/or data communications.

Wireless communications apparatus 10 may include a variety of components, which may be enclosed by enclosure 100. For example, wireless communications apparatus 10 may include a wireless communications device 102. Wireless communications device 102 may include any device configured to process electronic communications, such as a transponder, a network chip, a processor, a special purpose processor, a memory component, and the like. Merely by way of example, such a transponder may be one of, without limitation, a Ping1090i, Ping2020i, Ping200S/Si/Sr, Ping20Si, Ping200X, or other type of transponder. In some embodiments, such as where wireless communications device 102 includes a transponder, it may be configured to send and/or receive an ADS-B signal and/or may operate using at least one of Modest 2, 3, A, C, S, ES, 4, or 5. In some embodiments, a signal (e.g., an ADS-B signal) sent or received by wireless communications device 102 may be vertically polarized.

In some embodiments, wireless communications device 102 may connect to an antenna 104, which may send and/or receive wireless communications. For example, antenna 104 may be configured to send and/or receive signals to and/or from an aircraft, which may be sent and/or received from above and/or below an aircraft. Similarly, antenna 104 may be configured to allow communication with ground-based systems or satellite systems. In some embodiments, antenna 104 may be a dipole or a monopole antenna, which may be configured to send and receive signals to or from above and/or below the aircraft.

Wireless communications sent and received by an antenna 104 may pass through enclosure 100, which may be made of any of a variety of materials, including, but not limited to, such as plastic, fiberglass, metal, etc., which may be used to reduce signal interference. For example, an aircraft or a ground communications station may send and/or receive a signal to/from wireless communications apparatus 10, and these communications may be sent and/or received through antenna 104. In some embodiments, antenna 104 may be positioned within a fin-shaped portion of an enclosure 100, as shown in an exemplary fashion in FIG. 1A. For example, enclosure 100 may be conformed to a configuration suitable for a dipole and/or monopole antenna. Conforming the shape of enclosure 100 to the position, size, and/or shape of antenna 104 may reduce the amount of material needed to manufacture wireless communications apparatus 10, may improve aerodynamic qualities of wireless communications apparatus 10, and/or may improve the signaling quality of wireless communications apparatus 10. Antenna 104 may route information it has received to wireless communications device 102, which may in turn route information received to a computing and/or display device within an aircraft (e.g., a display within a cockpit of an aircraft).

Wireless communications apparatus 10 may also include a light 106. Enclosure 100 may be configured such that light 106 may be visible from outside of enclosure 100. For example, light 106 may be positioned on the exterior of enclosure 100, within or through an opening in enclosure 100, or within enclosure 100 (e.g., with at least a portion of enclosure 100 being at least translucent to allow for the light 106 to be seen externally from enclosure 100). Light 106 may be a navigation light, anti-collision light, rear-position light, rotating beacon light, or landing light, or any light configured to illuminate to notify observers (e.g., aircraft, autonomous devices, human observers on the ground, devices on the ground, etc.) as to the position, speed, shape, size, and/or dimensions of a vehicle to which wireless communications apparatus 10 may be attached, such as an aircraft. By way of example and without limitation, light 106 may be a halogen lamp, a strobe light, and/or an LED light. In some embodiments, wireless communications apparatus 10 may include multiple lights 106, and each light may have a different purpose (e.g., one light may be an anti-collision light, and another light may be a landing light). In some embodiments, light 106 may be configured to remain lit, flash, pulse, and/or alter its intensity. These actions may be controlled by a user (e.g.: by activating a switch that causes a signal to be sent to light 106 and control its behavior) and/or a contextual state of wireless communications apparatus 10 or a vehicle to which wireless communications apparatus 10 may be attached (e.g., airborne, traveling at a threshold speed, surrounded by level of air pressure meeting a threshold, presence in an environment having visibility meeting a threshold, a current time of day, etc.). For example, a light 106, which may be an anti-collision light, may be configured to flash only when an aircraft is airborne and/or airborne above a certain altitude. As another example, a light 106 may be configured to automatically activate (be lit, pulse, etc.) when natural light in an environment of an aircraft is below a certain threshold (e.g., indicating that it may be after sunset or before sunrise). Such aspects of an aircraft's contextual state may be determined by other devices and/or sensors within the aircraft (e.g., an altimeter), and/or components and/or sensors within wireless communications apparatus 10 (e.g., a light sensor). In some embodiments, enclosure 100 may be configured to allow light 106 to attach to the enclosure (discussed further with respect to FIG. 2B). For example, enclosure 100 may include a socket or other interface to which a light 106 may connect. By having light 106 integrated into wireless communications apparatus 10, functionality may be added to an aircraft (e.g. transponder functions on a wingtip) while still preserving lighting for navigation, position, anti-collision purposes etc. For example, light 106 may operate simultaneously with other components of wireless communications apparatus 10, such as wireless communications device 102 and/or communications unit 108.

System 10 may also include a communications unit 108, which may include a GPS chip, radio chip, WiFi chip, and/or any other processing component for wireless communications. In some embodiments, communications unit 108 may be subordinate to wireless communications device 102 (e.g., wireless communications device 102 may have central processing priority for communications routed within system 10). Communications unit 108 may also be enclosed by enclosure 100. Communications unit 108 may be configured to send and/or receive communications different from those sent and/or received by wireless communications device 102. For example, communications unit 108 may include a processor for processing communications such as radio signals. As another example, communications unit 108 may include a global navigation satellite system (GNSS) receiver and/or transceiver (e.g., contained by enclosure 100), for processing signals received from, and/or to be sent to, a satellite. Communications unit 108 may connect to an antenna 104 (a radio antenna, a GNSS antenna, etc.), which may be configured to send and/or receive signals, which may be routed to and/or from communications unit 108 (radio signals, GNSS signals, etc.). In some embodiments, communications unit 108 may process information received before routing it. As another example communications unit 108 may re-format GPS information into a format suitable for display (e.g., at a control head). By integrating communications unit 108, wireless communication system 10 may be able to provide additional functionalities beyond those that may be offered by wireless communications device 102, together in a single attachable unit. In some embodiments, communications unit 108 may connect to an antenna 110, which may send and/or receive communications (e.g., GPS communications) that are different from those sent and/or received by wireless communications device 102. In some embodiments, antenna 110 may be configured to receive a certain type of communication. For example, antenna 110 may be a monopole or dipole antenna. Antenna 110 may also have a particular length, shape, position, canting, and/or any other characteristic for maintaining reliable communications.

In some embodiments, communications unit 108 may include a sensor, such as a barometric altimeter, an air pressure sensor, a humidity sensor, a light sensor, an accelerometer, drone remote identification detector, etc. A sensor may detect particular contextual aspects (e.g., altitude, air pressure, humidity level, amount of light, visibility, speed, etc.) of wireless communications apparatus 10 and/or a vehicle to which wireless communications apparatus 10 may be attached. In some embodiments, communications unit 108 may include an altitude encoder.

Communications unit 108 may also include a control interface (e.g., for communicating with a control head). The interface may communicate with external components, such as a control head, via different communications channels. For example, the system may use a powerline modem, which my communicate data over wiring 114, or an RS232 line. Communications unit 108 may also be configured to communicate with external components via WiFi. In some embodiments, communications unit 108 may be configurable by another device (e.g., by a mobile device, such as an iOS or Android device, connected to wireless communications apparatus 10 over WiFi, which may be achieved through a configurable-over-WiFi control interface). For example, a mobile device may execute an application that allows the mobile device to connect to (e.g., over WiFi) and configure wireless communications apparatus 10. For example, a user interacting with a user interface of such an application may input, change, and/or delete information of, without limitation: a call sign, an International Civil Aviation Organization (ICAO) number, a maximum aircraft speed, a Vso, an ADS-B In capability, an ADS-B Out capability, an emitter type, an aircraft length, a GPS antenna lateral offset, a GPS antenna longitudinal offset, and/or any other information that may be used by wireless communications apparatus 10. Any of this information may also be automatically populated by the application based on information stored on wireless communications apparatus 10 (e.g., in a memory component). Based on inputs received at the application, wireless communications apparatus 10 may determine information to transmit (e.g., to other aircraft, to ground stations, etc.). Wireless communications apparatus 10 may also include any number of components discussed with respect to FIGS. 1B and 1C.

Figure 1B:
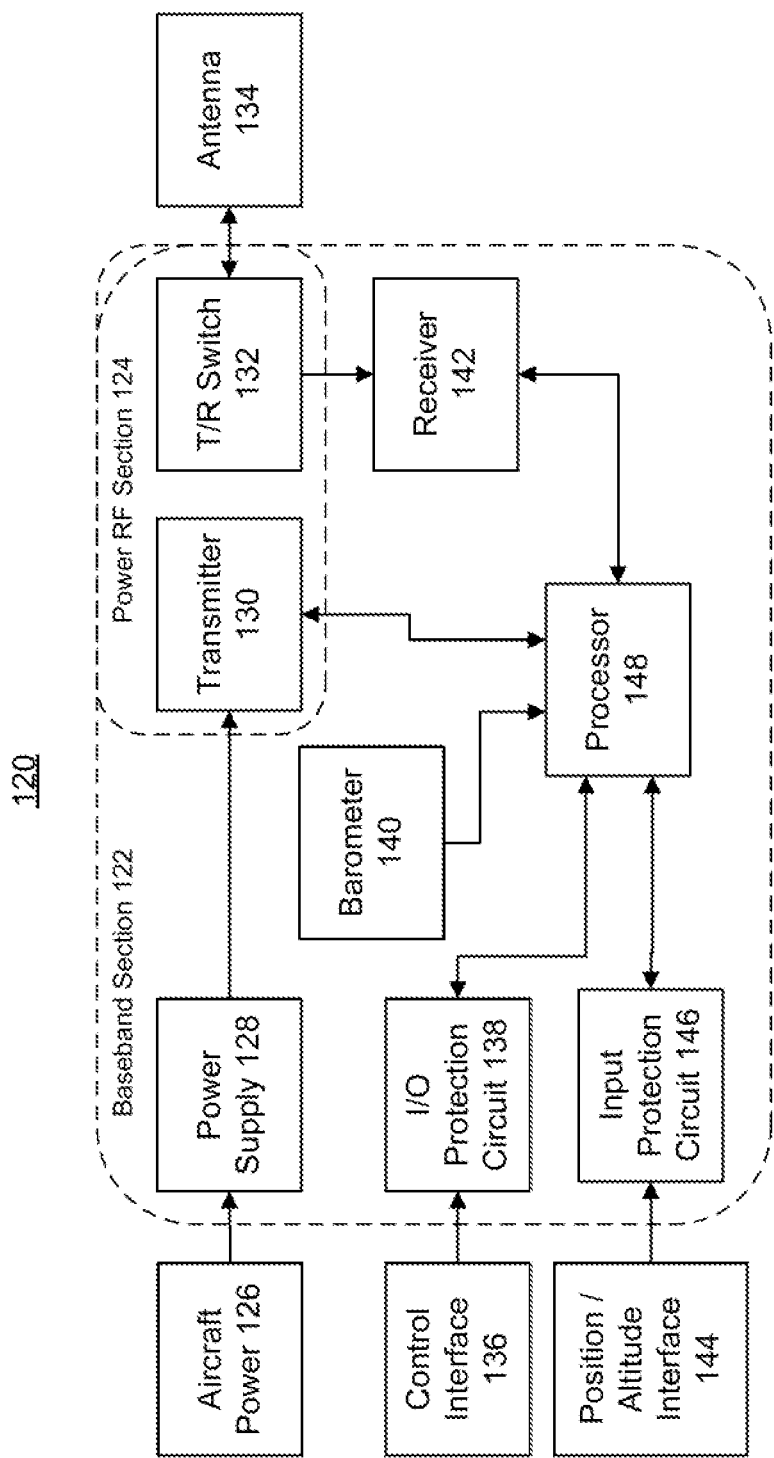
FIG. 1B illustrates an exemplary schematic representation of a first wireless communications system.

FIG. 1B illustrates an exemplary schematic representation of a first wireless communications system 120, which may be a constitute all or a portion of any of the apparatuses described herein. For example, components of first wireless communications system 120 may be part of a wireless communications apparatus 10. First wireless communications system 120 may include a baseband section 122 and a power radio frequency (RF) section 124. First wireless communications system 120 may include any or all of the exemplary components shown in FIG. 1B.

First wireless communications system 120 may include components that are designated, in this example, as part of baseband section 122. In some embodiments, first wireless communications system 120 may include a power supply 128, which may receive power from aircraft power 126 (e.g., a source of power within an aircraft, which may exist separately from a wireless communications apparatus 10). In some embodiments, first wireless communications system 120 may include an input-output (I/O) protection circuit 138, which may connect to a control interface 136, which may be separate from a wireless communications apparatus 10. I/O protection circuit 138 may connect to a processor 148 (e.g., a field-programmable gate array or FPGA, application-specification integrated circuit or ASIC, other integrated circuit, etc.), which may execute a program containing instructions for carrying out processes within first wireless communications system 120. For example, processor 148 may implement a transponder. Processor 148 may send and/or receive data to and/or from control interface 136. I/O protection circuit 138 may receive input from control interface 136 and route the input to processor 148, while protecting the system from dangerous or improper signals. First wireless communications system 120 may also include a barometer 140, which may sense barometric pressure values, which may be transmitted to processor 148. First wireless communications system 120 may also include a receiver 142, which may receive signals from a transmit-receive (T/R) switch 132, which may be part of power RE section 124 (described below). In some embodiments, first wireless communications system 120 may include an input protection circuit 146, which may connect to a position and/or altitude interface 144, which may allow processor 148 to send and/or receive data to and/or from position and/or altitude interface 144. Input protection circuit 146 may receive input from position and/or altitude interface 144 and route the input to processor 148, while protecting the system from dangerous or improper signals, processor 148 may carry out any number of processes, such as those described herein (e.g., processing transponder communications, processing communications for configuration sent over WiFi).

First wireless communications system 120 may also include components that are designated, in this example, as part of power RE section 124. Those components may include a transmitter 130, which may receive power from power supply 128, and may connect to processor 148 and may transmit signals over antenna 134. Transmitter 130 may be a transmitter for transmitting 1090 Mhz RF signals, including 1090 MHz replies to ATCRBS and Mode S interrogations.

In some embodiments, first wireless communications system 120 may include a transmit-receive (T/R) switch 132 that is connected to Transmitter 130, Receiver 142, and Antenna 134. T/R Switch 132 may connect Transmitter 130 and Receiver 142 to a shared antenna. T/R Switch 132 operates to switch the connection of the antenna to Transmitter 130 or Receiver 142 to allow communicate with the antenna when transmitting or receiving, respectively. Receiver 142 may receive 1030 MHz signals, including 1030 MHz ATCRBS and Mode S interrogations.

FIG. 1C illustrates an exemplary schematic representation of a second wireless communications system 160, which may be a constitute all or a portion of any of the apparatuses described herein. For example, components of second wireless communications system 160 may be an implementation of a wireless communications apparatus 10 alternative to first wireless communications system 120. Second wireless communications system 160 may include any or all of the exemplary components shown in FIG. 1C.

Second wireless communications system 160 may include a device 162 (e.g., a wireless communications apparatus 10). Aircraft power 164 (e.g., a source of power within an aircraft, which may exist separately from a wireless communications apparatus 10) may supply power to device 162. In some embodiments, aircraft power 164 may connect to a power supply 166, which may be part of device 162.

Device 162 may include a number of components, such as those shown in exemplary FIG. 1C. For example, device 162 may include a transponder 176, which may connect to at least one other component, and which may perform functions of a transponder, consistent with disclosed embodiments. Transponder 176 may connect to and receive power from power supply 166. In some embodiments, transponder 176 may connect to barometric pressure sensor 168, which may detect measurements of barometric pressure (e.g., in the environment of an aircraft to which device 162 may be attached) and transmit measurements to transponder 176. Device 162 may also include a control interface 170, which may connect to transponder 176 and control head 172, which may be separate from device 162 (e.g., a control head within a fuselage of an aircraft, which may be accessible from a cockpit of an aircraft). In some embodiments, transponder 176 may transmit 1090 Mhz RF signals (e.g., using antenna 182), including 1090 MHz replies to ATCRBS and Mode S interrogations. In some embodiments, transponder 176 may receive 1030 MHz signals (e.g., using antenna 182), including 1030 MHz ATCRBS and Mode S interrogations.

In some embodiments, device 162 may include a GPS component 174, which may receive power from power supply 166. GPS component 174 may be connected to GPS antenna 178, which may receive signals from other devices (e.g., a GPS constellation) and may route signals to GPS component 174. GPS component 174 may process received signals and may transmit signals to transponder 176, to which GPS component 174 may be connected.

Other components may also be included in device 162 and may connect to transponder 176. For example, device 162 may include a WiFi component 180, antenna 182 (e.g., antenna 104), and/or light 184 (e.g., light 106). WiFi component 180 may be configured to connect to an external device (e.g., mobile device) over WiFi, which may allow for configuration and/or information transmission, as discussed with respect to FIG. 1A. Antenna 182, which may be an antenna 104, may send and/or receive wireless communications, such as transponder communications (e.g., ADS-B signals). Light 184 may include any or all of the capabilities of light 106, discussed with respect to FIG. 1A.

Figure 2A:
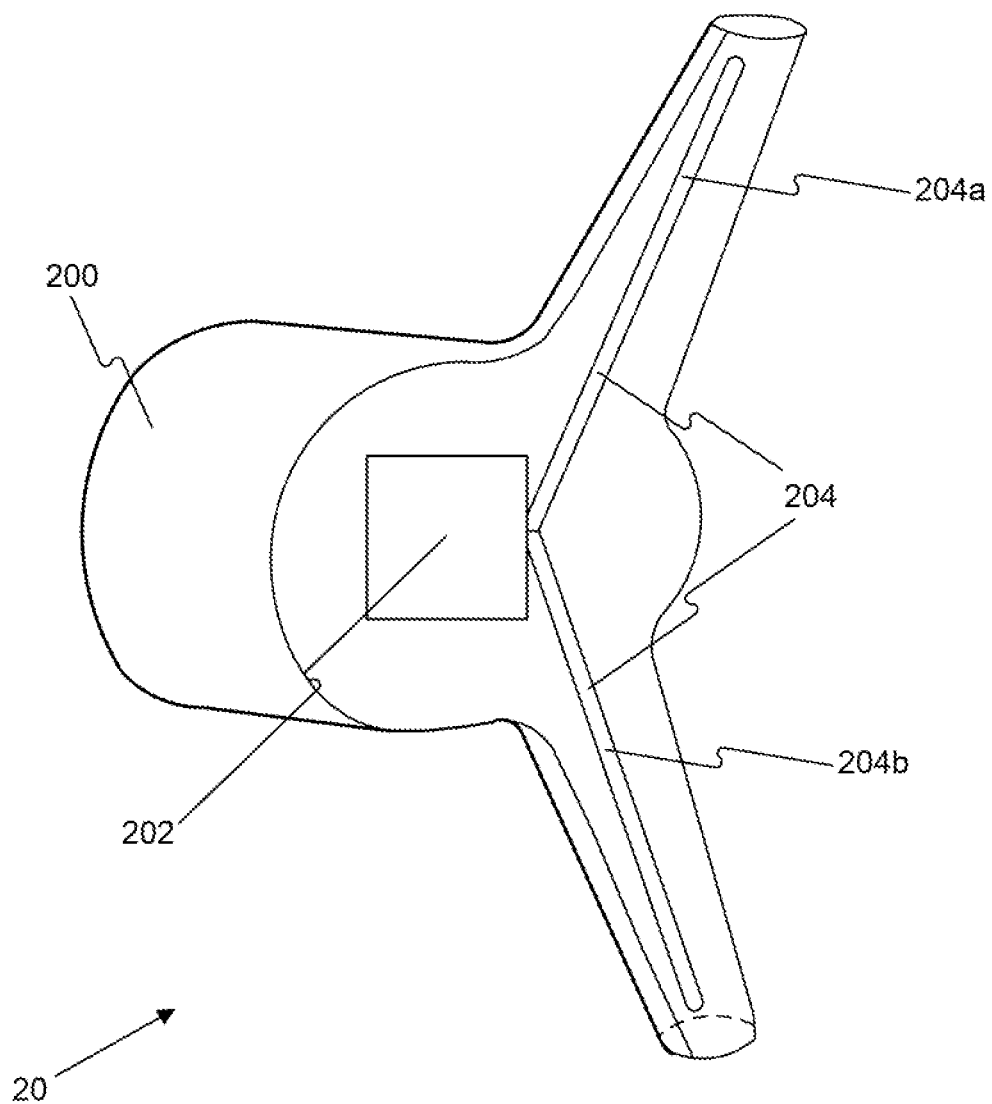
FIG. 2A illustrates an exemplary pictographic representation of a multi-finned wireless communications apparatus.

FIG. 2A illustrates an exemplary pictographic representation of a multi-finned wireless communications apparatus 20, which may include characteristics of wireless communications apparatus 10. For example, multi-finned wireless communications apparatus 20 may include an enclosure 200 (i.e., similar to enclosure 100), which may be configured to attach to a vehicle, such as to a wing of an aircraft. In some embodiments, multi-finned wireless communications apparatus 20 may be configured to be mounted using existing wingtip lighting locations and/or may use an upward and/or downward pointing dipole antenna for optimization of ground, air, and space-based communications. In other embodiments, enclosure 200 may be configured to attach to a tail or fuselage of an aircraft. Multi-finned wireless communications apparatus 20 may also include components 202, which may include a sensor, processor, memory, antenna, transponder, and/or component discussed with respect to FIGS. 1A, 1B, and/or 1C (e.g., a GNSS receiver).

Multi-finned wireless communications apparatus 20 may include an antenna, such as a dipole antenna 204 with two portions, antenna portion 204a and antenna portion 204b. Antenna 204 may connect to the components 202, which may include a wireless communications device (e.g., a transponder). In some embodiments, antenna portion 204a and/or antenna portion 204b may send and/or receive wireless communications. For example, antenna portion 204a and/or antenna portion 204b may be configured to send and/or receive signals to and/or from an aircraft, ground stations, or satellite systems. Such signals may be sent and/or received from above and/or below an aircraft. In other embodiments, a monopole antenna may be used and may be contained within an upward or downward angled fin.

As with enclosure 100 and wireless communications apparatus 10, enclosure 200 and/or any other part of multi-finned wireless communications apparatus 20 may be particularly configured to accommodate and/or enhance the capabilities of antenna portion 204a and/or antenna portion 204b. For example, enclosure 200 may have a particular shape (e.g., a dual-fin shape), which may allow for the placement of antenna portion 204a and/or antenna portion 204b within multi-finned wireless communications apparatus 20 while preserving or enhancing its aerodynamic properties.

In some embodiments, antenna portion 204a may be angled predominantly upward, and antenna portion 204b may be angled predominantly downward. In this way, multi-finned wireless communications apparatus 20 may allow for more reliable wireless electronic communications to receivers above and/or below an aircraft. In some embodiments, antenna portion 204a and antenna portion 204b may be part separate antennas that may alternate transmissions, achieving antenna diversity. Multi-finned wireless communications transponder apparatus 20 may also include any number of components discussed with respect to FIGS. 1B and 1C.

Figure 2B:
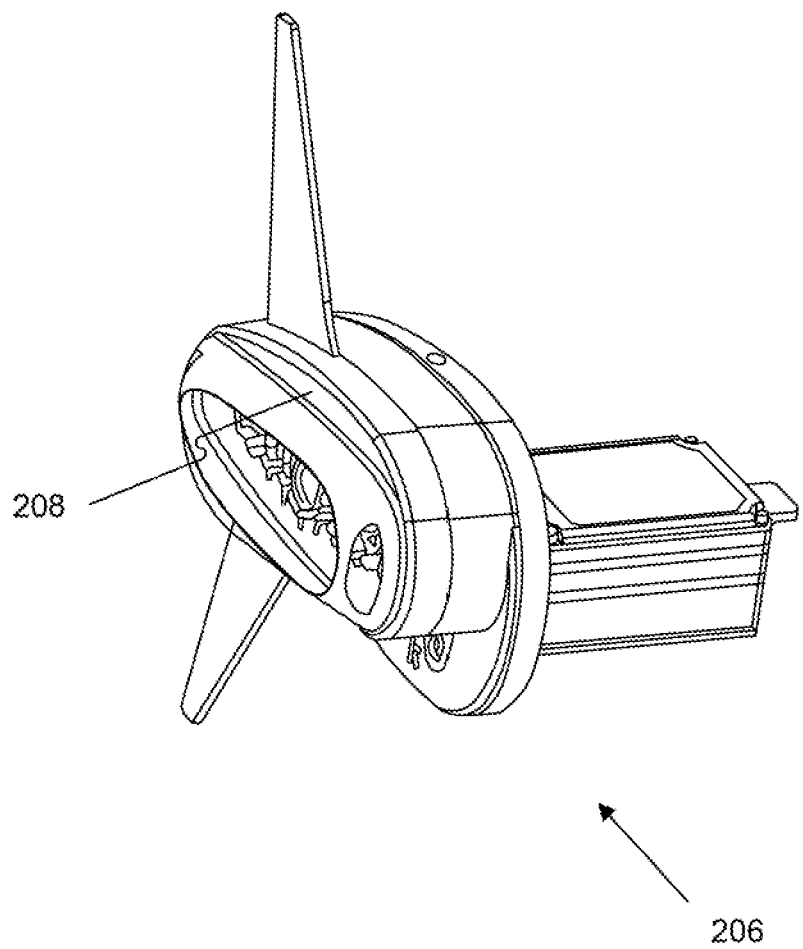
FIG. 2B illustrates an exemplary pictographic representation of a lighting interface wireless communications apparatus.

FIG. 2B illustrates a lighting interface wireless communications apparatus 206, which may be an instance of multi-finned wireless communications apparatus 20, tail-mountable wireless communications apparatus 30, or any other attachable apparatus described herein, consistent with disclosed embodiments. In some embodiments, lighting interface wireless communications apparatus 206 may be configured to allow a light to attach to an enclosure of lighting interface wireless communications apparatus 206 (e.g., as discussed with respect to FIG. 1A). For example, lighting interface wireless communications apparatus 206 may include a recessed region 208, which may have a particular configuration (size, shape, material, rigidity, etc.) allowing a light (e.g., light 106), or component including a light, to attach to an enclosure of lighting interface wireless communications apparatus 206 (e.g., an enclosure 200). For example, recessed region 208 may have a particular shape that allows a component including a light to snap or latch onto an enclosure of lighting interface wireless communications apparatus 206.

Figure 3:
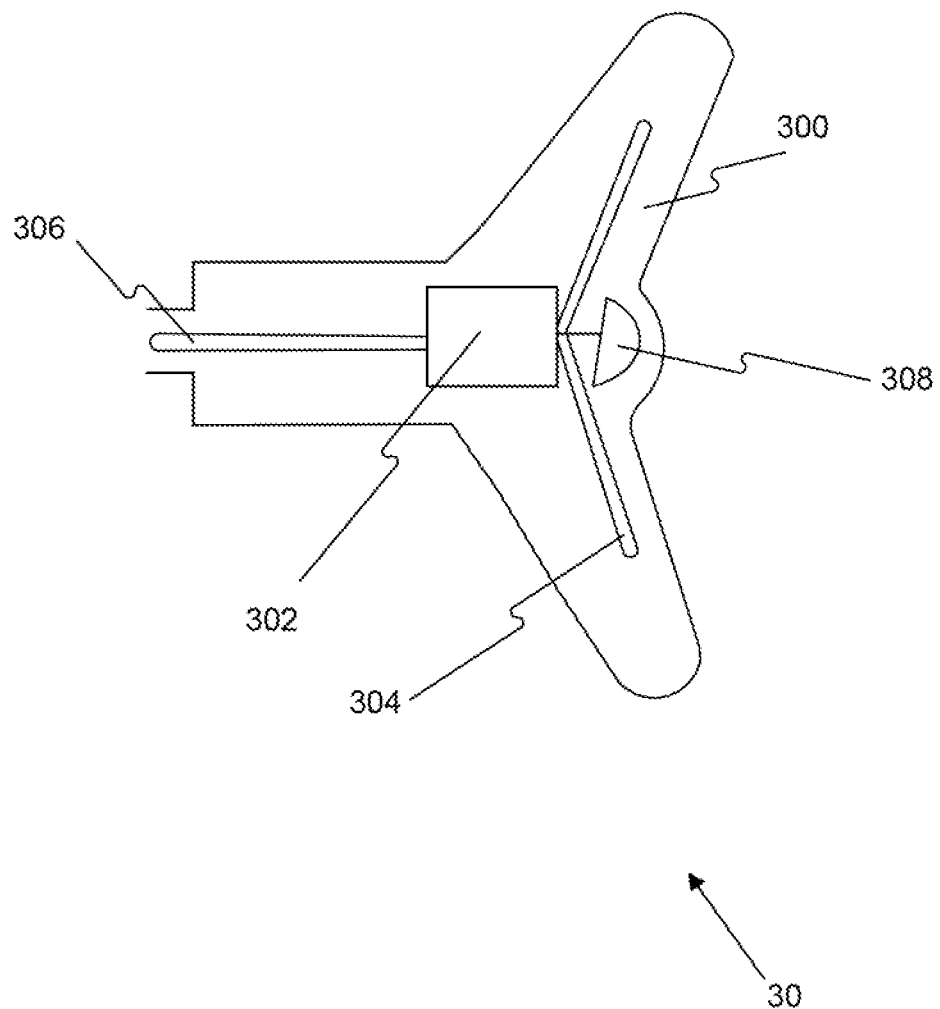
FIG. 3 illustrates an exemplary pictographic representation of a tail-mountable wireless communications apparatus.

FIG. 3 illustrates an exemplary pictographic representation of a tail-mountable wireless communications apparatus 30, which may include any or all of the characteristics of wireless communications apparatus 10. For example, tail-mountable wireless communications apparatus 30 may include an enclosure 300 (i.e., similar to enclosure 100), which may be configured to attach to a vehicle, such as to a tail of an aircraft. In some embodiments, tail-mountable wireless communications apparatus 30 may be configured to be mounted using existing tail lighting locations and may use an upward and/or downward pointing dipole antenna for optimization of ground, air, and space-based communications. Tail-mountable wireless communications apparatus 30 may also include components 302, which may include a sensor, processor, memory, antenna, transponder, and/or component discussed with respect to FIGS. 1A, 1B, and/or 1C (e.g., a GNSS receiver).

Similar to wireless communications apparatus 10, tail-mountable wireless communications apparatus 30 may include an antenna 304. Antenna 304 may also be the same as or similar to antenna 204, including portions 204a and 204b forming a dipole antenna. In some embodiments, antenna 304 may send and/or receive communications to and/or from any of components 302, such as a transponder.

Like wireless communications apparatus 10, tail-mountable wireless communications apparatus 30 may be configured to allow wiring 306 to pass through enclosure 300, such as to connect to components 302 (e.g., a circuit board, processor, memory, sensor, etc.) internal to enclosure 300. Wiring 306, like wiring 114, may comprise any combination of conductive and insulating materials configured to carry power and/or data communications.

Tail-mountable wireless communications apparatus 30 may also include a light 308, which may share any or all of the same characteristics as light 106, discussed with respect to FIG. 1A. For example, light 308 may be a navigation light, anti-collision light, rear-position light, rotating beacon light, or landing light, or any light configured to illuminate to notify observers (e.g., aircraft, autonomous devices, human observers on the ground, devices on the ground, etc.) as to the position, speed, shape, size, and/or dimensions of a vehicle to which wireless communications apparatus 30 may be attached, such as an aircraft. Tail-mountable wireless communications apparatus 30 may also include any number of components discussed with respect to FIGS. 1B and 1C.

Figure 4:
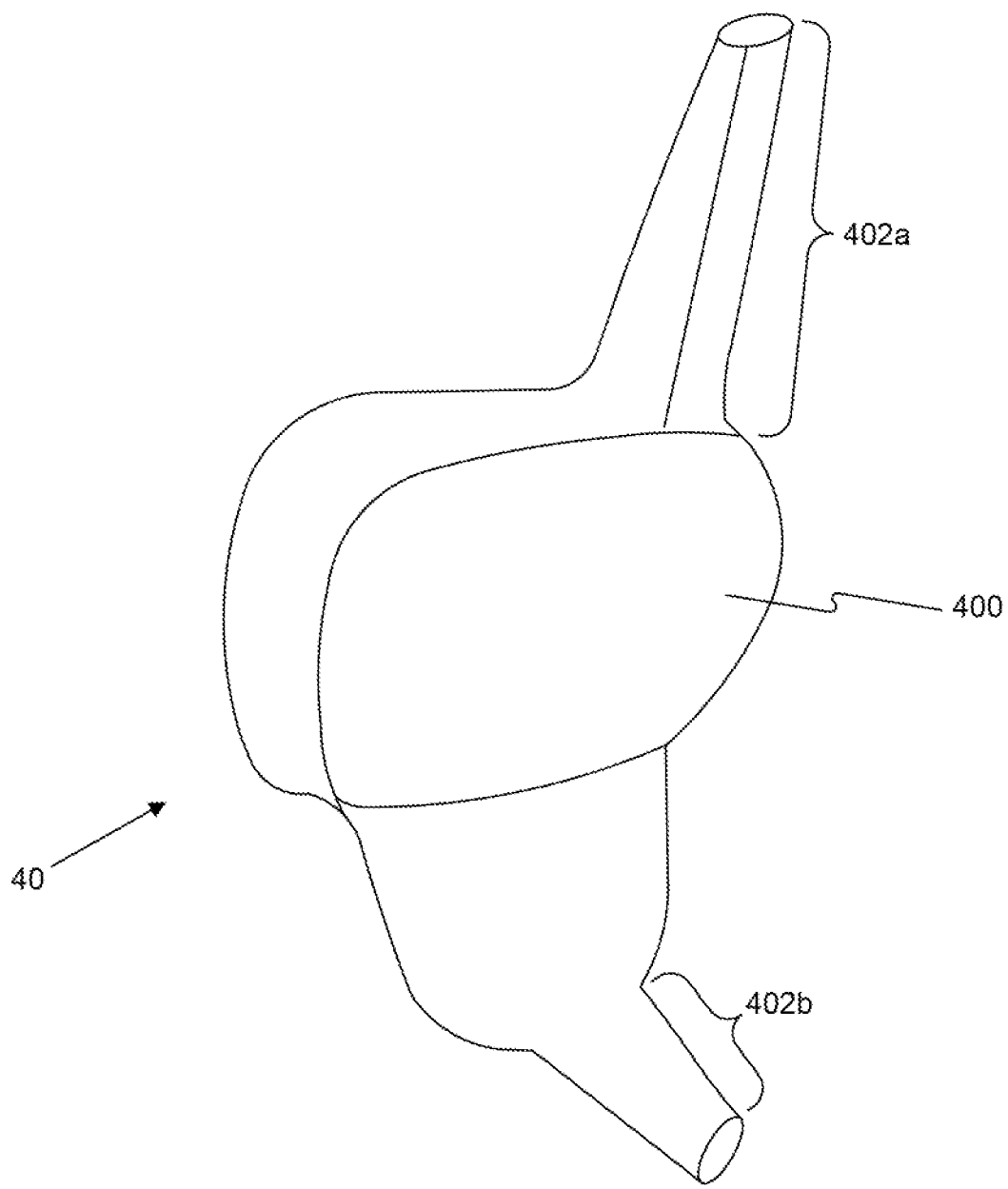
FIG. 4 illustrates an exemplary pictographic representation of a canted finned wireless communications apparatus.

FIG. 4 illustrates an exemplary pictographic representation of a canted finned wireless communications apparatus 40, which may include any or all of the characteristics of wireless communications apparatus 10. For example, canted finned wireless communications apparatus 40 may include an enclosure 400 (i.e., similar to enclosure 100), which may be configured to attach to a vehicle, such as to a tail of an aircraft. In some embodiments, enclosure 400 may be composed of a signal interference-reducing material. Enclosure 400 may be composed of a number of materials, including a plastic, metal, polycarbonate, fiberglass, etc. In some embodiments, enclosure 400 may be coated with a heat-resistant and/or low-friction coating, which may enhance aerodynamic properties of canted finned wireless communications apparatus 40 and/or may decrease a rate of degradation the system may experience over time.

Canted finned wireless communications apparatus 40 may also include components (not shown), which may include a sensor, processor, memory, antenna, transponder, and/or component discussed with respect to FIGS. 1A, 1B, and/or 1C (e.g., a GNSS receiver). For example, canted finned wireless communications apparatus 40 may include any device configured to process electronic communications, such as a transponder (e.g., a Ping200X transponder), a network chip, a processor, a special purpose processor, a memory component, and the like. For example, canted finned wireless communications apparatus 40 may also include any number of components discussed with respect to FIGS. 1B and 1C. Canted finned wireless communications apparatus 40, similar to wireless communications apparatus 10, may be configured to attach to a wing, tail, and/or fuselage of an aircraft.

While canted finned wireless communications apparatus 40 may share any or all characteristics of wireless communications apparatus 10, it may also include other desirable features. In some embodiments, canted finned wireless communications apparatus 40 may include a fin, which may be a protruding portion of enclosure 400. For example, canted finned wireless communications apparatus 40 may include a fin 402a, which may be disposed on a top portion of canted finned wireless communications apparatus 40. In some embodiments, canted finned wireless communications apparatus 40 may have a sub-fin 402b, which in some embodiments may be a portion of a larger fin structure, as shown in an exemplary fashion in FIG. 4. For example, sub-fin 402b may be a smaller fin that protrudes from a larger fin, which may be disposed on a bottom portion of canted finned wireless communications apparatus 40, as shown in an exemplary fashion in FIG. 4. In some embodiments, canted finned wireless communications apparatus 40 with a sub-fin 402b may allow for improved signaling in space-based systems. In other embodiments, canted finned wireless communications apparatus 40 may only have a fin or fins that do not have any number of sub-fins. Thus, canted finned wireless communications apparatus 40 may include any number of fins 402a and sub-fins 402b.

In some embodiments, canted finned wireless communications apparatus 40 may include a fin that encloses (e.g., with enclosure 400) a monopole antenna. In other embodiments, canted finned wireless communications apparatus 40 may include at least two fins containing a dipole antenna (similar to the exemplary depiction in FIG. 2). In some embodiments, an antenna may be contained within a fin and/or a sub-fin.

Figure 5:
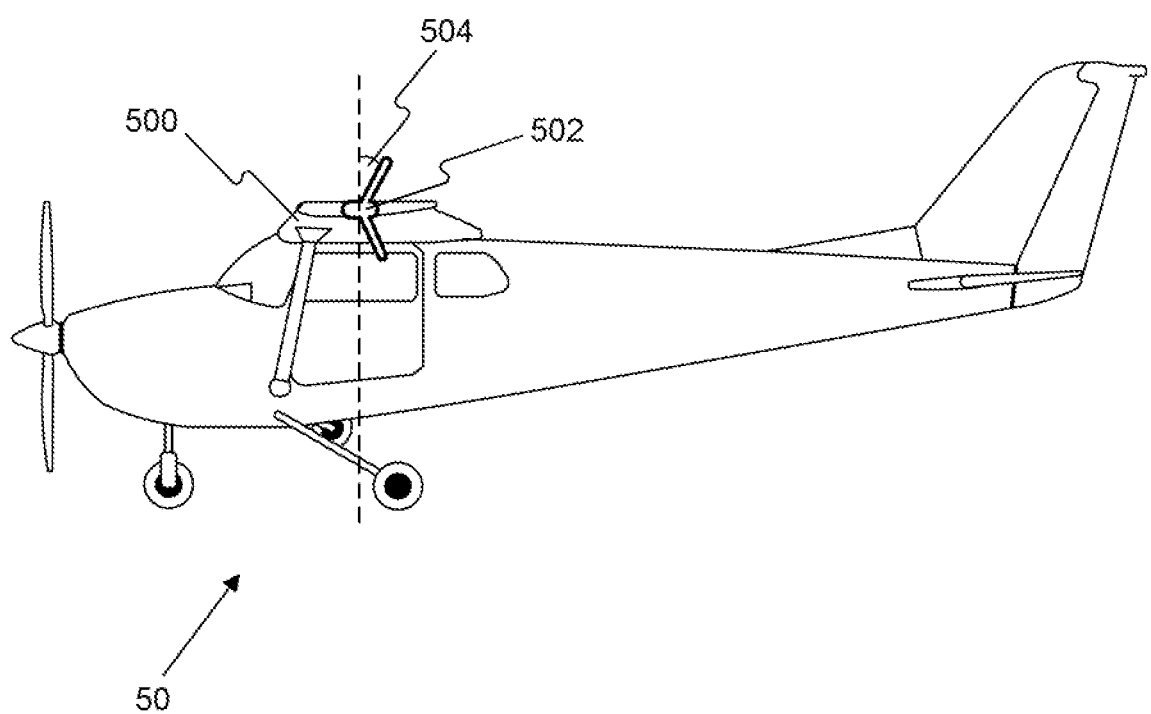
FIG. 5 illustrates an exemplary side-view pictographic representation of a canted wing-attachable wireless communications apparatus.

Canted finned wireless communications apparatus 40 may include a fin and/or sub-fin that may be canted in a particular fashion. For example, in some embodiments, enclosure 400 may include at least one protruding fin that is canted toward a rear side of an aircraft while enclosure 400 is attached to the aircraft. A solely exemplary visual depiction of a protruding fin that is canted toward a rear side of an aircraft is shown in FIG. 5. Canting an antenna may shift the axis of the antenna away from a vertical axis. For example, this may improve signaling to and/or from above and/or below an aircraft by shifting the "dead zone" of the antenna away from the vertical axis. This may be advantageous when communicating with satellites that are positioned nearly vertically overhead.

As a further example, a fin may be canted toward the rear side of an aircraft at an angle of between 5 and 60 degrees relative to a vertical axis, though any number of degrees of canting may be used. An angle of canting may be based on at least one of: a model of the aircraft, a shape of a fuselage of the aircraft, a size of a fuselage of the aircraft, a shape of a wing of the aircraft, or a size of a wing of the aircraft. For example, an aircraft having a smaller wing to which a canted finned wireless communications apparatus 40 is attached may have a fin canted to a smaller degree than an aircraft having a larger wing. Canting an antenna (i.e., within a fin) toward the rear of an aircraft may reduce signal interference of communications sent to and/or from a component in canted finned wireless communications apparatus 40, and/or may also have beneficial aerodynamic properties (e.g., relative to a non-canted system) for a vehicle (e.g., aircraft) to which canted finned wireless communications apparatus 40 may be attached.

Figure 6:
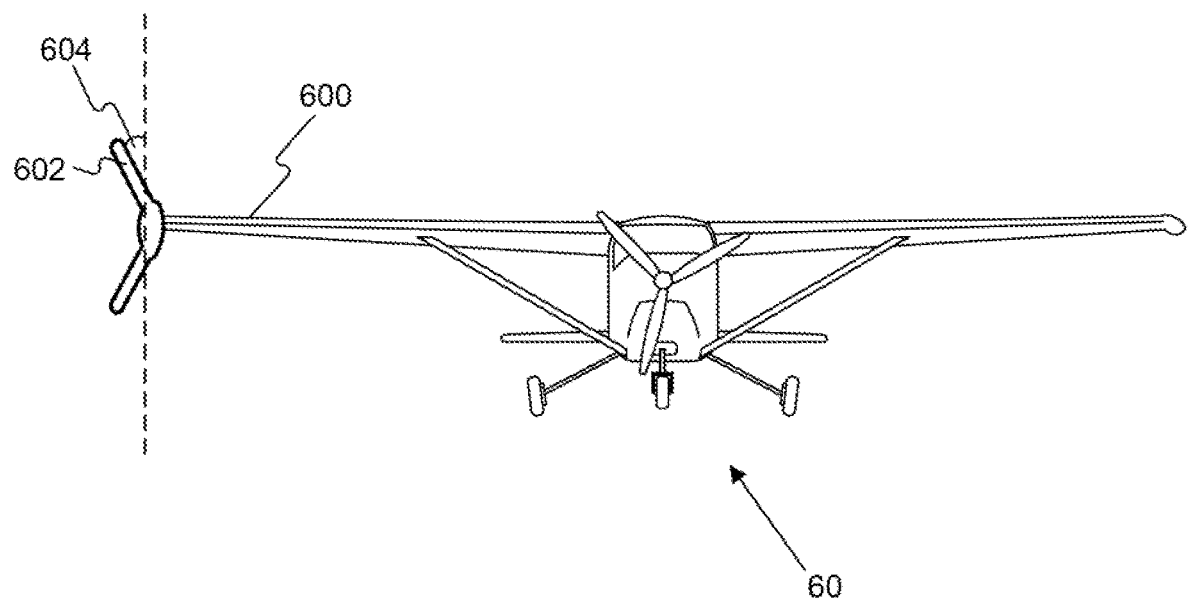
FIG. 6 illustrates an exemplary frontal-view pictographic representation of a canted wing-attachable wireless communications apparatus.

In some embodiments, enclosure 400 may include at least one protruding fin that may be canted away from a fuselage of the aircraft while the enclosure is attached to the aircraft. A solely exemplary visual depiction of a protruding fin that may be canted toward a rear side of an aircraft is shown in FIG. 6. As a further example, fin may be canted away from the fuselage of the aircraft at an angle of between 5 and 60 degrees relative to a vertical axis, though any number of degrees of canting may be used. An angle of canting may be based on at least one of: a model of the aircraft, a shape of a fuselage of the aircraft, a size of a fuselage of the aircraft, a shape of a wing of the aircraft, or a size of a wing of the aircraft. As with canting an antenna toward the rear of an aircraft, canting an antenna (i.e., within a fin) away from the fuselage of an aircraft may reduce signal interference of communications sent to and/or from a component in canted finned wireless communications apparatus 40, and/or may also have beneficial aerodynamic properties (e.g., relative to a non-canted system) for a vehicle (e.g., aircraft) to which canted finned wireless communications apparatus 40 may be attached.

Exemplary FIG. 5 further illustrates an exemplary pictographic representation of a protruding fin (e.g., fin 402a) that is canted toward a rear side of an aircraft while a wireless communications apparatus 502 (e.g., canted finned wireless communications apparatus 40) is attached to the aircraft 50. In this exemplary depiction, wireless communications apparatus 502 is attached to a wing 500 of the aircraft 50. As discussed with respect to FIG. 4, and as depicted in FIG. 5, wireless communications apparatus 502 includes a fin that is canted toward the rear of aircraft 50 at an angle 504 with respect to a vertical axis (shown by the dashed line).

Exemplary FIG. 6 further illustrates an exemplary pictographic representation of a protruding fin (e.g., fin 402a) that is canted away from a fuselage of an aircraft while a wireless communications apparatus 602 (e.g., canted finned wireless communications apparatus 40) is attached to the aircraft 60. In this exemplary depiction, wireless communications apparatus 602 is attached to a wing 600 of the aircraft 60. As discussed with respect to FIG. 4, and as depicted in FIG. 6, wireless communications apparatus 602 includes a fin that is canted away from the fuselage of aircraft 60 at an angle 604 with respect to a vertical axis (shown by the dashed line).

Figure 7:
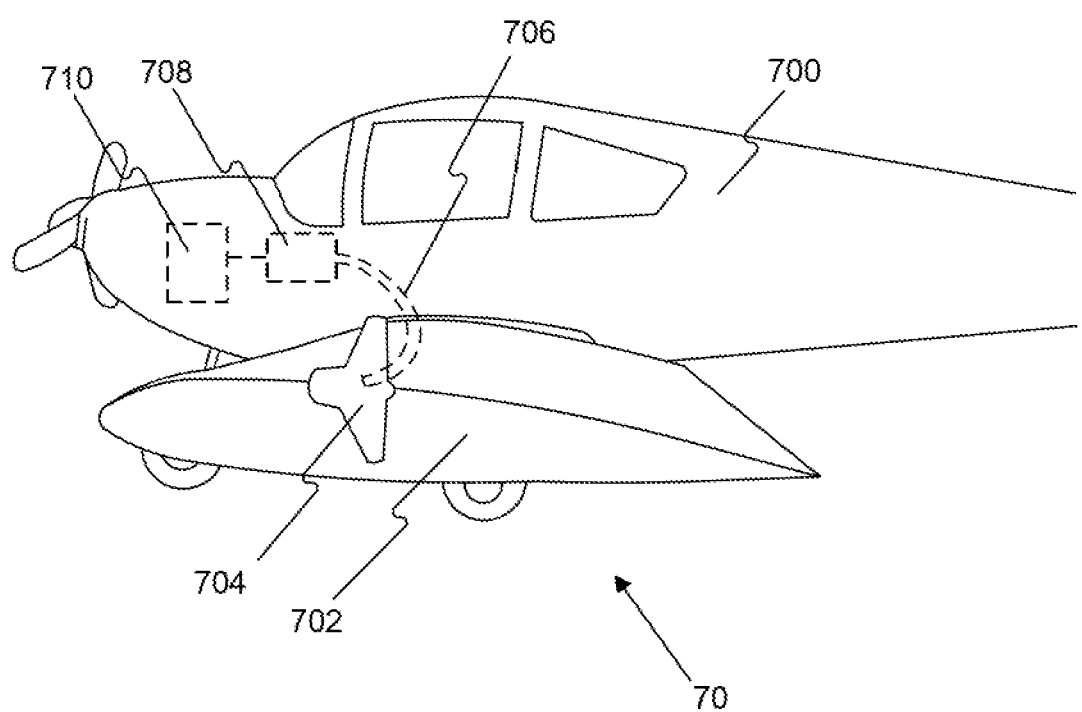
FIG. 7 illustrates an exemplary pictographic representation of a wing-attachable wireless communications apparatus.

FIG. 7 illustrates an exemplary pictographic representation of an aircraft communications system for an aircraft 70, within which a wireless communications apparatus may be integrated. In some embodiments, the aircraft communications system may include a wireless communications apparatus 704 (e.g., wireless communications apparatus 10, 30, etc.), which may be attached to a wing 702 of aircraft 70. Wireless communications apparatus 704 may be connected to internal electronic components 708 and/or a power source 710 by wiring 706. For example, wiring 706 may carry data communications between wireless communications apparatus 704 and internal electronic components 708, which may include a control head, display, and other components allowing a user to configure or interact with wireless communications apparatus 704. In some embodiments, wiring 706 may be initially configured to only send power from power source 710 (e.g., intended for a light on a wing of an aircraft), but may be configured to send data communications as well, by using at least one powerline networking component, such as a powerline modem. For example, a powerline networking component may be included within wireless communications apparatus 704 and another may be part of internal electronic components 708. In other embodiments, wiring 706 may include wiring for a data connection (e.g., an RS232 connection) to electronic components 708, such as a control head. In yet other embodiments, a wireless communications component 704 may communicate wirelessly with internal electronic components 708. These embodiments may be achieved with a wireless communications apparatus 704 configured to attach to a wing of an aircraft as well as a wireless communications apparatus 704 configured to attach to a tail of an aircraft.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

For example, while some embodiments are discussed in a context involving aircraft, these elements need not be present in each embodiment. While aircraft communications apparatuses and systems are discussed in some embodiments, other electronic systems (e.g., radio communication systems) having any kind of wireless communications devices may also operate within the disclosed embodiments. Such variations are fully within the scope and spirit of the described embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. An apparatus for routing wireless communications, the apparatus comprising:
an enclosure configured to attach to an external portion of an aircraft, wherein the enclosure:
comprises a first protruding portion angled upward and a second protruding portion angled downward; and
contains:
a wireless communications device, and
at least one antenna in communication with the wireless communications device, the at least one antenna being configured to:
send or receive signals to or from the aircraft;
send or receive signals above the aircraft; and
send or receive signals below the aircraft.

2. The apparatus of claim 1, wherein the enclosure is configured to attach to an external lighting interface of the aircraft.

3. The apparatus of claim 2, further comprising a light, wherein:
the light is one of a navigation light, anti-collision light, rear-position light, rotating beacon light, or landing light.

4. The apparatus of claim 3, wherein the enclosure is configured to attach to one of a wing or tail of the aircraft.

5. The apparatus of claim 2, wherein the enclosure is configured to allow a light to attach to the enclosure.

6. The apparatus of claim 1, wherein the wireless communications device comprises a transponder.

7. The apparatus of claim 6, wherein the enclosure is configured to attach to an external lighting interface of the aircraft.

8. The apparatus of claim 7, wherein the at least one antenna includes a dipole antenna.

9. The apparatus of claim 7, further comprising a light, wherein:
the light is one of a navigation light, anti-collision light, rear-position light, rotating beacon light, or landing light.

10. The apparatus of claim 8, wherein the enclosure is configured to attach to one of a wing or tail of the aircraft.

11. The apparatus of claim 7, wherein the enclosure is configured to allow a light to attach to the enclosure.

12. The apparatus of claim 6, wherein the transponder is configured to send and/or receive an ADS-B signal.

13. The apparatus of claim 12, wherein the enclosure contains a global navigation satellite system (GNSS) receiver.

14. The apparatus of claim 13, wherein the enclosure contains a global navigation satellite system (GNSS) antenna.

15. The apparatus of claim 1, wherein the enclosure contains a barometric altimeter.

16. The apparatus of claim 1, wherein the enclosure contains a radio antenna.

17. The apparatus of claim 6, wherein the transponder operates according to one of Modes 1, 2, 3, A, C, S, ES, 4, or 5.

18. The apparatus of claim 1, wherein the at least one antenna includes a monopole antenna.

19. The apparatus of claim 1, wherein the enclosure is configured to attached to a mounting plate.

20. The apparatus of claim 1, the apparatus further comprising a sensor configured to detect a contextual aspect of the apparatus or the aircraft.

21. The apparatus of claim 6, wherein:
the transponder is configured to:
send signals from the transponder to at least one satellite using the at least one antenna; and
send or receive signals to or from other aircraft or ground stations; and
the enclosure further contains a global positioning system (GPS) receiver and a GPS antenna in communication with the GPS receiver.

22. The apparatus of claim 1, wherein the at least one antenna includes an antenna contained, at least in part, by the first protruding portion and the second protruding portion.

23. The apparatus of claim 1, wherein the at least one antenna includes a first antenna contained, at least in part, by the first protruding portion and a second antenna contained, at least in part, by the second protruding portion.

24. The apparatus of claim 1, wherein the enclosure has a shape based on the external portion of the aircraft to which the enclosure is configured to attach.

* * * * *